Jan. 31, 1956

P. E. RENOUX 2,733,071

CHUCK FOR MACHINE TOOLS

Filed May 27, 1953

Inventor
Pierre E. Renoux
by Malcolm W. Pierce
Attorney

Jan. 31, 1956  P. E. RENOUX  2,733,071
CHUCK FOR MACHINE TOOLS
Filed May 27, 1953  5 Sheets-Sheet 3

Inventor
Pierre E. Renoux
by Malcolm W. Fraser
attorney

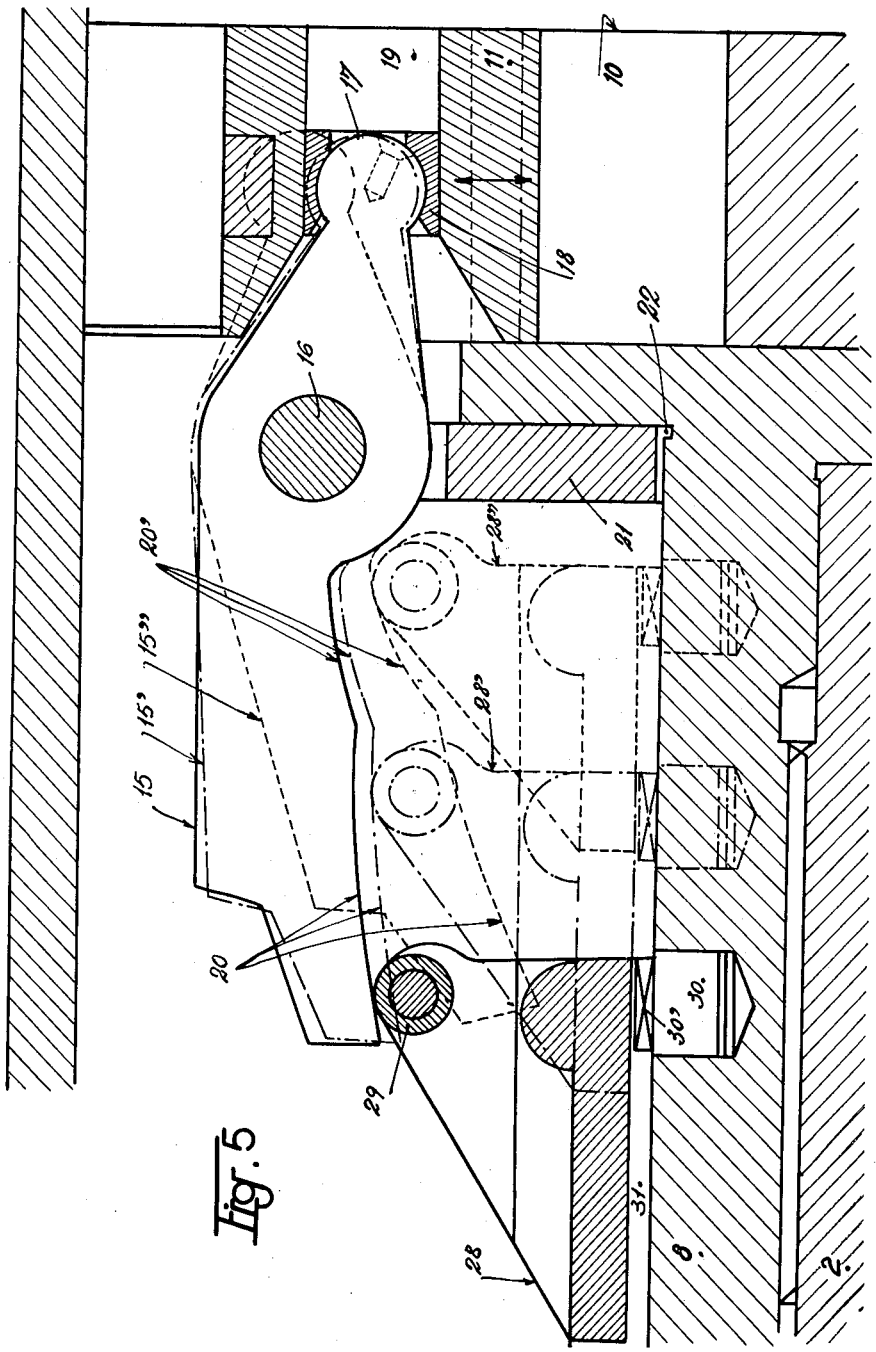

Jan. 31, 1956
P. E. RENOUX
2,733,071
CHUCK FOR MACHINE TOOLS
Filed May 27, 1953
5 Sheets-Sheet 5
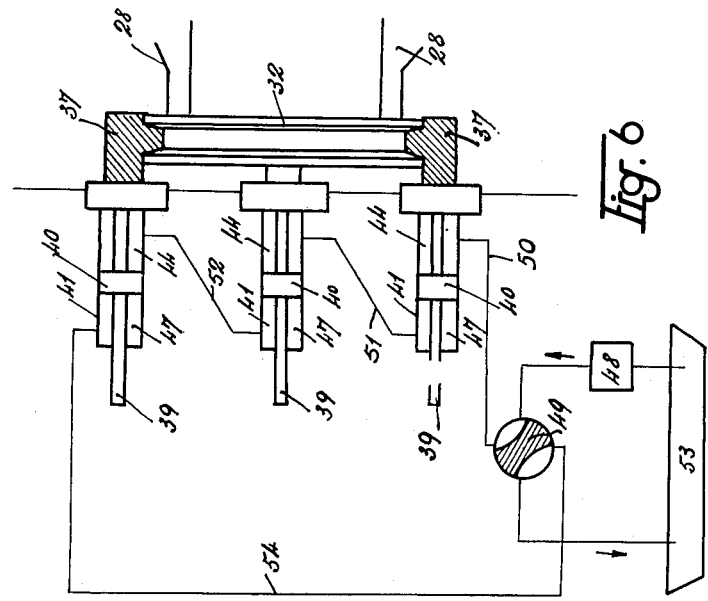
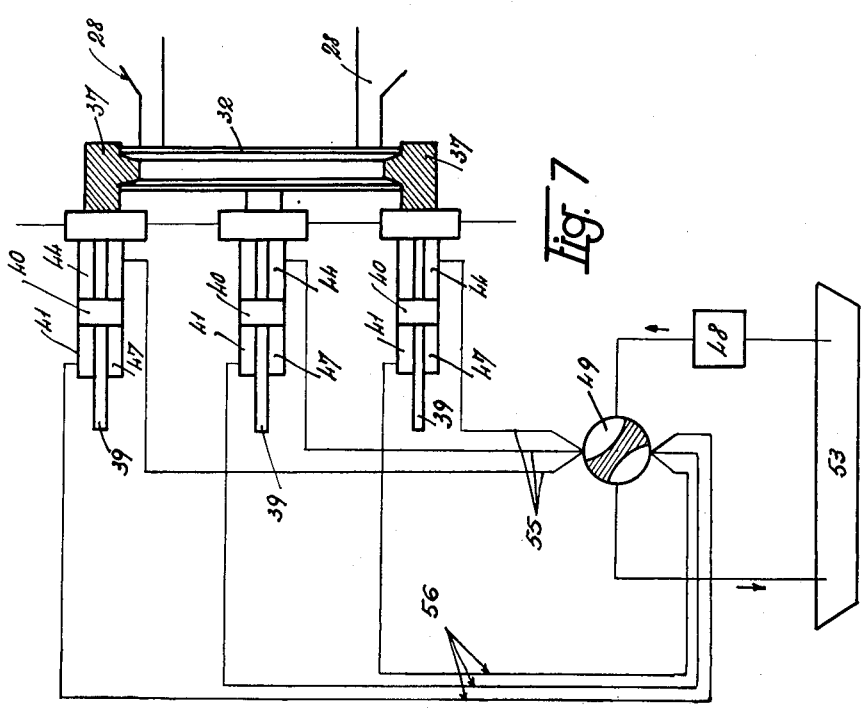
Inventor
Pierre E. Renoux
by Malcolm W. Fraser
Attorney

United States Patent Office 2,733,071
Patented Jan. 31, 1956

2,733,071

CHUCK FOR MACHINE TOOLS

Pierre Edouard Renoux, Argenteuil, France, assignor to Société Anonyme dite: Cri-Dan, Paris, France, a French company Application May 27, 1953, Serial No. 357,835

Claims priority, application France June 4, 1952

3 Claims. (Cl. 279—4)

When it is desired to machine elongated, chiefly tubular parts, on a lathe, in particular on a thread-cutting lathe, these parts are generally introduced through the tubular spindle of the machine and it has already been proposed to provide such a spindle with a clamping chuck at each end so as to ensure a more rigid positioning of the axis of the work-piece with reference to the axis of said spindle.

But it may occur that, before it has been introduced inside the spindle of the machine, the work-piece to be machined has been submitted to preliminary machining operations and that its axis of revolution is thus materially defined by centers, a bore, a bevel, a bearing or the like. The final machining executed on the lathe should consequently be executed round this same axis of revolution. It is possible to use for this purpose tail stocks or dead centers, whereby the work-piece can be centered in accordance with the previously machined surfaces.

The work-piece may also be centered by means of a plurality of machined surfaces, for instance by means of bearings on the inside of the spindle, said surfaces being unable, by reason of their location, to be engaged by the jaws of the chuck.

However, if the outer surface of the work-piece is provided in register with the chuck with unevennesses or with a slight eccentricity with reference to the axis of revolution which has been defined hereinabove, it is apparent that it is necessary to hold the chuck fast over the work-piece without modifying the location of said axis of revolution of said work-piece.

The present invention has for its object a chuck for machine tools considered generally, and chiefly for thread-cutting machines, the jaws of which chuck are urged automatically by fluid pressure into a position such that the outer surface of the work-piece to be machined is clamped by said jaws which match exactly the unevennesses of said surface and follow exactly the faulty centering of the work-piece, if any such faulty centering should occur.

According to an advantageous feature of the invention, the fluid pressure is exerted on parts mounted on a stationary section of the machine on the outside of the spindle of the latter.

According to another feature of my invention, the operation of the jaws is performed by means of levers including suitably shaped outlined surfaces engaged by parts carried along by the rotary movement of the spindle, but adapted to be submitted to the action of the pressure exerted by the fluid so as to allow the jaws to execute a rough positioning of the jaws before the actual clamping stage.

In accordance with a still further feature of the invention, the jaw-controlling levers are pivotally secured to a floating member which is mounted with a certain clearance so that it may be shifted radially with reference to the axis of the spindle and may be held fast in any desired radial position within predetermined limits; said position may be defined, consequently, by the irregularities in the surface or the faulty centering of the work to be machined or again, it may be defined in a manner such as to hold fast said floating member before operation, whereby the chuck is transformed into a coaxially clamping chuck.

According to yet another feature of the invention, the control means for the operation of the jaws are of a multiple type and are distributed round the spindle, preferably in angularly equidistant locations.

Still further features and objects of my invention will appear in the reading of the following description, given by way of example and by no means in a binding sense, of a preferred embodiment of the object of the invention as applied to the case of the machining of a tube, reference being made to accompanying drawings, wherein:

Fig. 5 illustrates diagrammatically the different positions that may be assumed by the jaw-controlling lever and by the sleeve actuating said lever during the jaw-opening or closing steps;

Figs. 6 and 7 illustrate diagrammatically two systems connecting the control cylinders of the jaws with the circuit of fluid under pressure.

Figure 3:
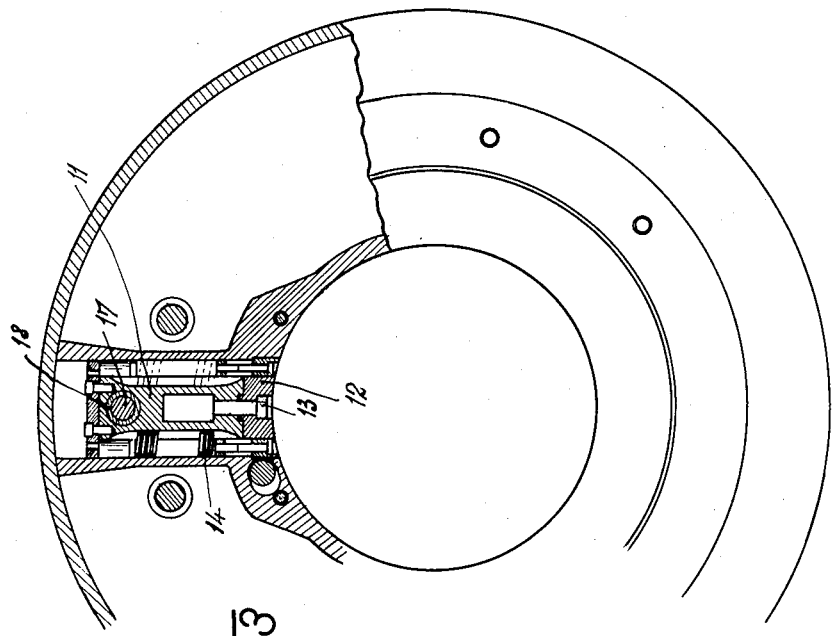
Fig. 3 is a cross-section through line III—III of Fig. 2.
Figure 1:
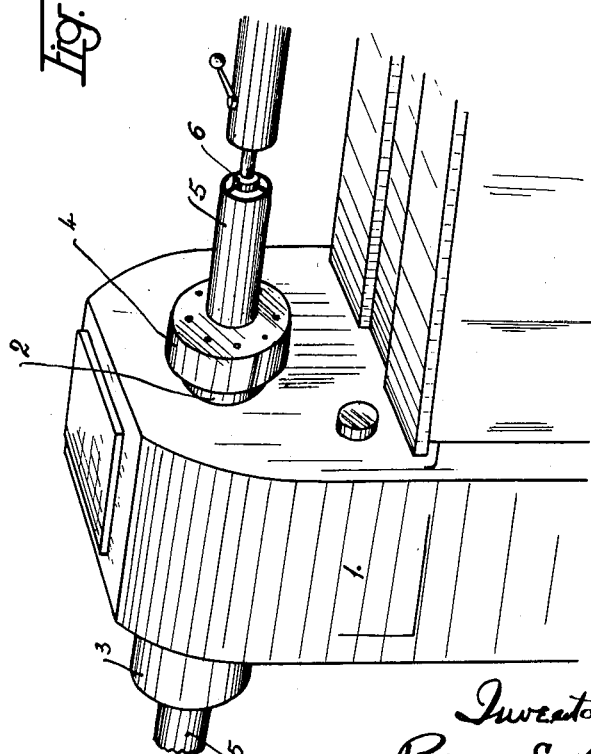
Fig. 1 is a perspective view of a machine-tool spindle associated with a tail stock or dead center and two chucks.

Fig. 1 illustrates diagrammatically an arrangement for clamping and centering a thread-cutting machine including the conventional arrangement of a frame 1 in the upper part of which is revolubly carried a tubular spindle 2 carrying at its end to either side of the frame 1, two clamping chucks 3 and 4. Inside said tubular spindle associated with the chucks, is fitted the work to be machined, constituted e. g. by a tube 5 the end of which is carried by a head-stock 6 which allows centering the tube 5 in conformity with the surfaces thereof which have already been machined.

In order to take into account the unevennesses of the outer surface of the tube 5 or the possible slight eccentricity of the latter with reference to its axis of revolution that is properly defined in a material sense, one should clamp the jaws of the chuck 4 over the tube, without modifying the location of the axis of the tube.

The chuck is constituted, as illustrated in Fig. 2–5, as follows: over the end of the spindle 2 is threadedly secured at 7 the actual body 8 of the chuck. A safety screw 9 holds said body 8 rigidly secured to the end of the spindle 2. In the three radial recesses 10 provided in said body 8 and arranged at equal angular distances from one another, may slide radially jaw carriers 11 (see more particularly Figs. 2 and 3) to each of which carriers is secured a removable jaw 12 as provided by the screwing-down of a screw 13. Springs 14 engaging the jaw carriers urge them radially away from the axis X—X of the spindle 2.

Each jaw carrier 11 is submitted to the action of a lever 15 pivotally secured to a spindle 16. At one end, the lever 15 carries a rotula 17 which may move inside a corresponding recess provided in a bush 18 adapted to be shifted slightly inside a recess 19 formed in the jaw carrier 11.

At its other end, the lever 15 is provided with a slope 20 the shape of which will be described hereinafter. The pivotal axis 16 of each lever 15 is carried by a floating ring 21 mounted over the body 8 of the chuck with a predetermined radial clearance at 22 (Fig. 22). The said ring 21 is held axially in contacting relationship with the peripheral flange 23 of the body 8 by a screw 24, the medial sections 25 of which pass through the flange 23 with a slight clearance, said clearance being at least as large as the clearance 22. When the screws 24 are screwed home into the ring 21 by acting through wrenches on the square heads 26 of the screws, this provides for the locking against the flange 23 of the medial sections 25 of larger diameter of the screws 24 on one hand and of the ring 21 on the other hand, said ring 21 being thus held fast with reference to the body 8 of the chuck in any desired radial position, as allowed by the size of the clearance 22. The end of the larger diameter medial section 26 of the screw 24 is laterally shiftable inside the recess 27 provided in the flange 23 and serves as a guide for the ring 21.

Figure 2:
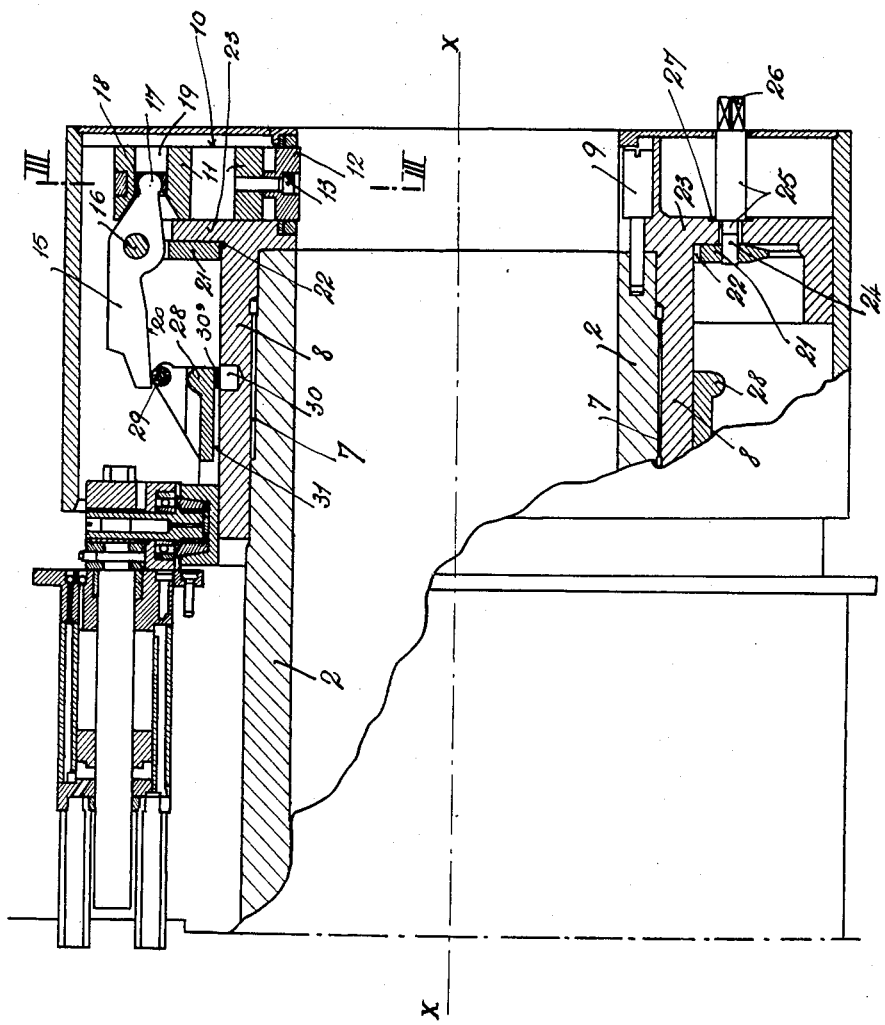
Fig. 2 is a longitudinal partial sectional view through the axis of the spindle showing in its upper section a jaw with its control lever and its actuating means, while its lower sections shows the safety screw for the body of the chuck and the arrangement for holding the floating control member fast.

The end of the lever 15 provided with the slope 20 is submitted to the thrust exerted by a control sleeve 28 with the interposition of rollers 29. The sleeve 28 is adapted to slide longitudinally over the body 8 of the chuck but it is driven into rotation with the latter through the agency of the key 30 screwed into the body 8, and the head 30' of which slides inside a groove 31 formed inside the sleeve 28 (Figs. 2 and 4).

Figure 4:
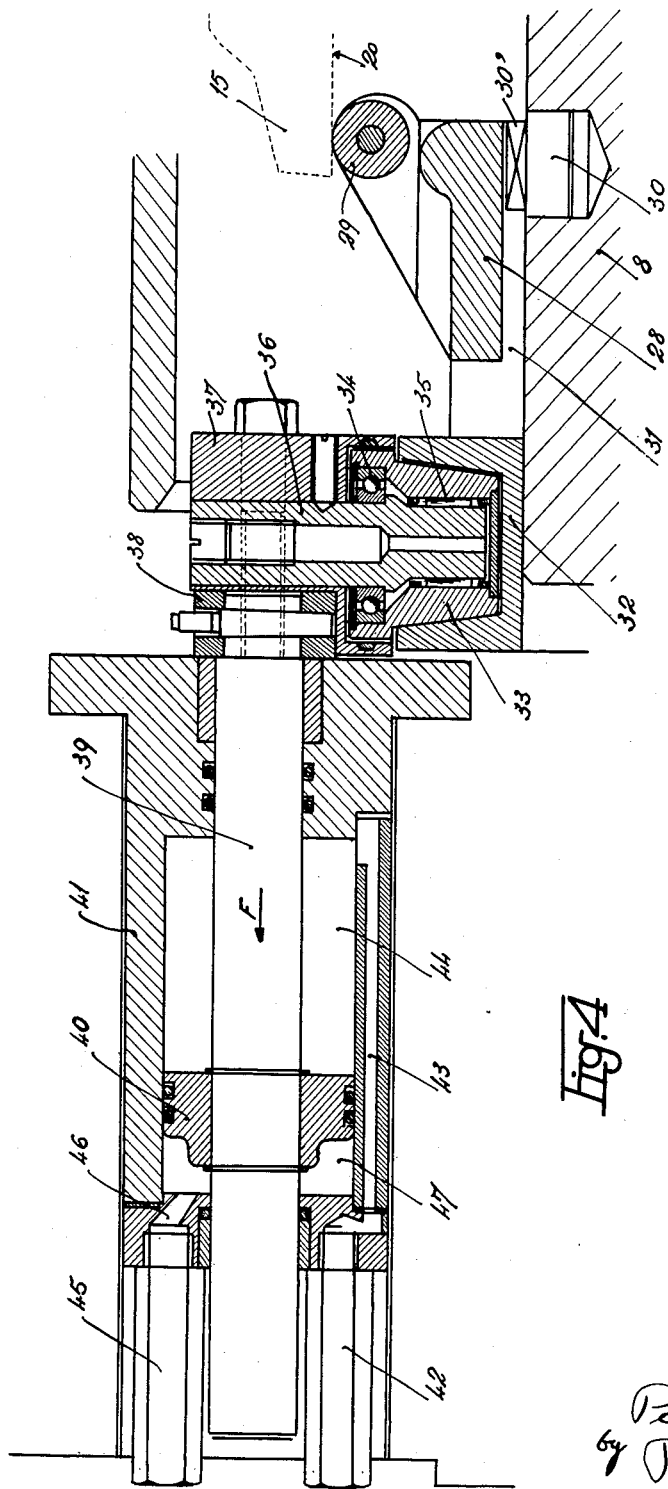
Fig. 4 is a view on a larger scale of the upper left-hand section of Fig. 2.

The sleeve 28 includes a grooved annulus 32 in which may run rollers 33 (Fig. 4). The latter are each fitted with the interposition of a ball bearing 34 and of a needle bearing 35 over a spindle 36 fitted inside an annular carrier 37.

In the rear surface of the annular carrier 37 is fitted a ring 38 secured to the ends of three piston rods 39 which are thus rigid with the carrier 37 and are constrained to execute identical movements.

These three piston rods 39 are distributed at equal angular distances from one another round the axis X—X of the spindle 2. Each piston rod 39 is rigid with a piston 40 movably carried inside a stationary cylinder 41. A fluid under pressure may be fed either through the pipes 42, 43 into the inner chamber 44 defined by each of said cylinders or else, through the pipes 45—46 into the outer chamber 47 of each cylinder.

The three cylinders 41 may be mounted in series as shown in Fig. 6 and the fluid pressure fed by the pump 48 is then applied through the distribution cock 49 and through the pipe 50 into the inner chamber 44 of a first cylinder. The outer chamber 47 of said cylinder is connected through a pipe 51 with the inner chamber 44 of the next cylinder, the chamber 47 of which is connected in its turn through a pipe 52 with the chamber 44 of the last cylinder. The chamber 47 of the latter is connected with the fluid tank 53 through a pipe 54 controlled by the distributor cock 49.

The three cylinders 41 may also, in a modification, be mounted in parallel, as shown in Fig. 7. The fluid pressure is then applied simultaneously through the pipes 55 to the chambers 44 of all three cylinders, the chambers 47 of which communicate then through the pipes 56 with the fluid-containing tank 53.

The operation of the arrangement disclosed is as follows:

Supposing each of the three pistons 40 occupies a position corresponding to the forward end of its stroke inside the corresponding cylinder 41, the rollers 29 on the sleeve 28 bear against the ends of the slopes 20 on the cooperating levers 15 at a point near the pivotal axis 16 thereof, the positions being shown in dotted lines in Fig. 5 at 28'' for a sleeve and at 15'' for a lever. The ends of the levers 15 provided with rotulas 17 are thus raised and the jaw carriers 11 are brought to the outer ends of their strokes inside their recesses 10; the jaws 12 are completely released and spaced with reference to the tube to be machined that has been fitted inside the spindle 2.

Now, if fluid pressure is applied to the chambers 44 of the different cylinders 41, the piston rods 39 will all move rearwardly in the direction of the arrow F (Fig. 4), whereby they draw the sleeve 28 along with them through the agency of the rollers 33. During this movement, the rollers 29 roll over the slopes 20 of the levers 15 and produce a rocking movement of the latter, whereby the jaw carriers 11 are urged towards the axis X—X of the spindle 2 and consequently, the tube to be machined is finally held fast between the jaws 12 (see the successive positions, illustrated in Fig. 5 in dot-and-dash lines at 28' and in solid lines at 28 for said sleeve, the corresponding positions of the lever being shown similarly at 15' and at 15).

The outline of the slopes 20 on the levers is established in a manner such that the jaws are first moved towards each other at a comparatively high speed, while the rollers 29 move over the portion of the slope 20 forming a larger angle with the axis of the spindle, as shown at 20' in Fig. 5. The engagement of the rollers 29 over said slope section 20' corresponds to the positioning step. When the jaws have thus been brought near each other, their movement becomes slower, the rollers 29 rolling on the section of the slope 20 forming a smaller angle with the spindle axis, as shown at 20 in Fig. 5, this corresponding to the actual stamping stage.

If the tube to be machined has an uneven surface or is eccentric with reference to the axis X—X of the spindle 2, it is apparent that the jaws 12 do not engage simultaneously the surface of the tube; but as the pivotal axes 16 of the different levers 15 are carried by the floating ring 21, this will lead automatically to a radial shifting of the latter until all the jaws 12 are actually in contact with the surface of the tube.

While the movement of the piston rods 39 continues in the direction of the arrow F, the tube to be machined remains reliably clamped between the jaws. It is sufficient to lock the screws 24 tight so as to hold the floating ring 21 fast and thereby to rigidly position the tube to be machined, with reference to the chuck.

The release of the jaws is obtained through a reverse operation by applying fluid pressure inside the chambers 47 of the different cylinders 41; return springs urge then the jaw carriers 11 radially apart and away from the axis of the spindle, whereby the levers 15 are caused to rock in a direction opposed to the precedingly described movement of the latter.

The floating ring 21 may either be allowed to move radially and freely over the flange 23 or else if required, it may be held fast in a stationary position with reference to the body 8 of the chuck. In this latter case, the chuck may serve as a chuck of the coaxial clamping type. This may be done in the case of the chuck 3 shown in Fig. 1 for instance.

It is also possible to cut out the clearance 22 whereby a concentric clamping chuck is also obtained.

What I claim is:

1. In a machine-tool, particularly a threading machine, a rotary hollow spindle into which the workpiece is fitted, a chuck mounted around the extremity of said spindle and rotating with it, jaws radially slidable in said chuck, springs urging said jaws to move radially from the axis of said spindle; swingable pivoted levers urging said jaws to move nearer the axis of said spindle, a cam surface on each lever, an annulus free to slide radially in any direction about the chuck and carrying the pivots of said levers, a handling sheath driven in rotation by said spindle and capable of sliding longitudinally on the chuck, rollers carried by said sheath and capable of rolling on the inner face of said pivoted levers, an annular groove formed at the rear of said sheath, rollers rolling in said groove and mounted on a common annular support concentric with the chuck, fixed cylinders distributed around the axis of said spindle, pistons moving in said cylinders to act on said annular support so as to actuate the handling sheath and engage said cam surfaces to swing said pivoted levers to clamp or unclamp the jaws according to the direction of the displacements of said pistons in said cylinders, and pipes for driving the pressure fluid into said cylinders to cause the pistons to move.

2. In a machine-tool, particularly a threading machine, a rotary hollow spindle into which the work piece is fitted, a chuck mounted about the extremity of said spindle and rotating with it, jaws slidable in said chuck, springs urging said jaws radially from the axis of said spindle, swinging pivoted levers urging said jaws closer to the axis of said spindle, the inner face of each lever having a substantially inclined portion terminating in a position of less inclination, an annulus free to slide radially in any direction about the chuck and carrying the pivots of said levers, a handling sheath driven in rotation by said spindle and capable of sliding longitudinally on said chuck, rollers carried by said sheath and capable of rolling on the inner face of said pivoted levers, so as to cause the clamping, rapid at the beginning, then slower, of the jaws, an annular groove formed at the rear of said sheath, rollers rolling in said groove and mounted on a common annular support concentric with the chuck, fixed cylinders distributed about the axis of said spindle, pistons movable in said cylinders to act on said annular support so as to actuate the handling sheath and swing said pivoted levers to clamp and unclamp the jaws according to the direction of the displacement of the pistons of said cylinders, and pipes for driving the pressure fluid into said cylinders to cause the displacements of the pistons.

3. In a machine tool, particularly a threading machine, a rotary hollow spindle, into which the workpiece is fitted, a chuck mounted about the extremity of said spindle and rotating with the latter, jaws slidably radially in said chuck, springs urging said jaws to move radially from said spindle, pivoted swingable levers urging said jaws to move closer to the axis of said spindle, a cam surface on each lever, an annulus free to slide radially in any direction about the chuck and carrying the pivots of said levers, clamping means allowing for the immobilization of said annulus in any radial position with respect to the chuck, a handling sheath driven in rotation by said spindle and capable of sliding longitudinally on the chuck, rollers carried by said sheath and capable of rolling on the inner face of said pivoted levers, an annular groove provided at the rear of said sheath, an annular common support concentric with the chuck, rollers rolling in said groove and secured on said common support, fixed cylinders distributed about the axis of said spindle, pistons movable in said cylinders to act on said annular support so as to actuate the handling sheath and engage said cam surface to swing said pivoted levers to clamp or unclamp the jaws according to the direction of the displacements of the pistons in said cylinders, and pipes for driving the pressure fluid into said cylinders to cause the displacements of their pistons.

References Cited in the file of this patent

UNITED STATES PATENTS

| | | |
|---|---|---|
| 1,833,822 | Brown | Nov. 24, 1931 |
| 2,375,115 | Kylin | May 1, 1945 |
| 2,426,376 | Smallpeice | Aug. 26, 1947 |
| 2,524,485 | Sloan | Oct. 3, 1950 |
| 2,613,943 | Trudeau | Oct. 14, 1952 |
| 2,643,132 | Hunziker et al. | June 23, 1953 |